United States Patent
Carnall

(10) Patent No.: US 9,037,136 B2
(45) Date of Patent: May 19, 2015

(54) METHOD AND APPARATUS FOR RECORDING EVENTS

(76) Inventor: Murat Carnall, Leeds (GB)

( * ) Notice: Subject to any disclaimer, the term of this patent is extended or adjusted under 35 U.S.C. 154(b) by 762 days.

(21) Appl. No.: 11/764,204

(22) Filed: Jun. 17, 2007

(65) Prior Publication Data

US 2008/0014947 A1     Jan. 17, 2008

Related U.S. Application Data

(63) Continuation of application No. PCT/GB2005/004885, filed on Dec. 19, 2005.

(51) Int. Cl.
| | |
|---|---|
| *H04W 4/00* | (2009.01) |
| *G08B 21/22* | (2006.01) |
| *H04W 8/00* | (2009.01) |
| *H04W 8/08* | (2009.01) |
| *H04W 8/20* | (2009.01) |
| *H04W 8/24* | (2009.01) |

(52) U.S. Cl.
CPC ............... *G08B 21/22* (2013.01); *H04W 8/00* (2013.01); *H04W 8/005* (2013.01); *H04W 8/08* (2013.01); *H04W 8/20* (2013.01); *H04W 8/245* (2013.01)

(58) Field of Classification Search
CPC ........ G08B 21/22; H04W 8/00; H04W 8/005; H04W 8/08; H04W 8/20; H04W 8/245
USPC ........ 455/420, 419, 67, 435.1, 435.2; 379/21, 379/27; 396/679; 345/156, 163; 710/16, 18, 710/9; 700/231; 709/238
See application file for complete search history.

(56) References Cited

U.S. PATENT DOCUMENTS

| | | | |
|---|---|---|---|
| 2001/0055982 A1* | 12/2001 | Umeda ..................... | 455/560 |
| 2003/0003777 A1* | 1/2003 | Lesesky et al. ............... | 439/34 |
| 2003/0050966 A1* | 3/2003 | Dutta et al. .................. | 709/203 |
| 2004/0181540 A1* | 9/2004 | Jung et al. ................... | 707/100 |
| 2005/0213511 A1* | 9/2005 | Reece et al. ................. | 370/252 |
| 2009/0222200 A1* | 9/2009 | Link et al. ................... | 701/202 |

* cited by examiner

*Primary Examiner* — Mahendra Patel
(74) *Attorney, Agent, or Firm* — Shiells Law Firm P.C.; Theodore F. Shiells

(57) ABSTRACT

A data collection method for collecting data describing at least one encounter of a mobile wireless device with at least one other wireless device, said method comprising: conducting a digital handshake between said mobile wireless device and said at least one other wireless device over a wireless link; and communicating a record of said encounter between said mobile wireless device and said other wireless device to a recording device.

24 Claims, 12 Drawing Sheets

Mobile Device A

| Date message received | Time message received | Device identifier | Date of encounter | Time of encounter | Location of encounter | Duration of encounter | Comms sent/received | User specified |
|---|---|---|---|---|---|---|---|---|
| 22 Nov 2004 | 10.04 | 44 114 248 1038 | 21 Nov 2004 | 22.17 | - | 2.17 | - | MOB |
| 22 Nov 2004 | 10.08 | 89 39 2399 7685 | 22 Nov 2004 | 10.08 | Bradford | 1.20 | 1 voice | - |
| 22 Nov 2004 | 10.22 | Battye@RBOS.com | 22 Nov 2004 | 10.22 | - | 1.55 | 1 voice | - |
| 22 Nov 2004 | 14.30 | 44 020 1287 4625 | 22 Nov 2004 | 14.30 | - | 7.18 | 1 picture | JPEG |
| 22 Nov 2004 | 14.38 | 44 020 1287 4625 | 22 Nov 2004 | 14.38 | Grid of xxxx; yyyy | 10.20 | 1 text | TXT |
| 22 Nov 2004 | 18.55 | Device type [manf. Code] | 22 Nov 2004 | 17.25 | Grid of aaaa:bbbb | 45.12 | - | - |
| 23 Nov 2004 | 9.01 | 44 117 240 0000 | 22 Nov 2004 | 8.55 | Leeds | 12.00 | 1 voice | Ringtone, MP3 |
| 23 Nov 2004 | 12.20 | 44 115 609 1020 | 23 Nov 2004 | 12.20 | - | 0.30 | - | - |

Fig. 11

METHOD AND APPARATUS FOR RECORDING EVENTS

CROSS-REFERENCE TO RELATED APPLICATIONS

This continuation application claims priority to international application serial number PCT/GB2005/004885 filed on Dec. 19, 2005 and Great Britain application serial number 0427643.2 filed on Dec. 17, 2004.

FIELD OF THE INVENTION

The present invention relates to the fields of surveillance, monitoring methods and apparatus and intelligence gathering. Particularly, but not exclusively, the invention relates to an improved method and apparatus for recording events and encounters experienced by a mobile wireless device.

BACKGROUND OF THE INVENTION

Knowledge of the whereabouts of individual persons is of general interest in many scenarios, as is having a knowledge of the persons with whom an individual person is associating or has associated with.

For example, the parents of a child or teenager have a legitimate interest in tracking the whereabouts of that child, and knowing who the child's friends are and with whom the child is associating.

Similarly, in a school environment teachers or administrators of the school have a legitimate interest in monitoring which pupils or students have turned up for school, and with which groups of persons they are associating with whilst at school. Crime prevention authorities such as the police take a high degree of interest in the contacts, connections and associations of known or suspected criminals, as well as their patterns of movement and favored locations.

There are several known technologies which are currently used to track the whereabouts of persons. In the field of electronic tagging, it is known to fix a transceiver to a person's limb in order to track their whereabouts and physical location. Such systems are known as "electronic tags." Whilst such systems give authorities some knowledge of a person's whereabouts and physical location, they give no specific insight into the activities or associations of that person. Further, in order to apply an electronic tag to a person, there must be legal authority to do so, and in general, in the UK, once a tag is applied to a person, the person wearing the tag is not at liberty to remove the tag without breaching an order of court. This restricts the use of such electronic tags to a limited class of known criminals, and therefore also limits its usefulness to the crime prevention authorities. Further, there is no possibility that such monitoring is covert because the wearer of the electronic tag is always aware that the tag is attached and is being monitored.

In another scenario, in some countries, visitors to the country need to report to a local police station at regular intervals, for example daily or weekly. There is a problem that this places restrictions on the person's movement within the country, and also places a burden on the local police authorities in being available to acknowledge daily or weekly visits to police stations.

It is known from other fields of monitoring, such as vehicle tracking, to provide wireless enabled digital tracking devices having location sensors, for example global positioning system (GPS) sensors, which are remotely interogable for monitoring the physical location of the vehicle to within the range of approximately plus or minus 10 meters via a satellite link and/or a terrestrial mobile phone network.

More advanced location positioning systems have been developed for military use. However in many cases technical details of these are not publicly available, and therefore these systems do not form part of the state of the art.

However, in general there is no current technology which is broadly applicable to a wide range of persons, and which has high market penetration and wide spread low cost availability which enables a knowledge of a persons activities and associations to be recorded, which are generally are non intrusive on that persons activities.

SUMMARY OF THE INVENTION

Specific embodiments and methods described herein aim to provide an electronic record comprising a list of wireless devices with whom a holder of a mobile wireless device has had encounters with. This may be achieved by making a record and storing a record data every time a mobile wireless device encounters another wireless device within a pre-determined physical range, typically but not essentially, of the order of a few meters or tens of meters.

The electronic record accumulates a history of encounter events concerning the mobile wireless device, and may have wide spread uses. Particularly, but not exclusively, in a preferred embodiment, the electronic record may be used to track a series of encounters of a user of the mobile wireless device with users of other wireless devices, and thereby may provide a register by which potential witnesses and/or suspects in a criminal activity may be identified. Other uses of the embodiments are described in the detailed description herein.

According to a first aspect of the present invention, there is provided a data collection method for collecting data describing at least one encounter of a mobile wireless device with at least one other wireless device, said method comprising: conducting a digital handshake between said mobile wireless device and said at least one other wireless device over a wireless link; and communicating a record of said encounter between said mobile wireless device and said other wireless device to a recording device.

According to a second aspect of the present invention, there is provided a method of collecting and recording data describing an encounter between a mobile wireless device and at least one other wireless device, said method comprising:

conducting a digital hand shake between said mobile device and said at least one other device over a wireless link when said mobile device and said at least one other wireless device are within a pre-determined range of each other; and storing said record of said hand shake in a data storage device.

According to a third aspect of the present invention, there is provided a method of collecting and storing data in a register of encounter records, each encounter record representing an encounter between a first mobile device and another device, said method comprising:

each time said first mobile device is within proximity of another device with which said mobile device is capable of communicating, said mobile device communicating with said other device and performing an acknowledgement process whereby said first mobile device acknowledges that it is within proximity of said other device; and upon completion of each said acknowledgement procedure, entering a record of said acknowledgement into a database.

According to a fourth aspect of the present invention, there is provided an apparatus for recording a register of encounter events, said apparatus comprising:

at least one mobile wireless device configured to conduct an acknowledgement procedure;

at least one other wireless device capable of conducting an acknowledgement procedure with said at least one mobile device; and at least one recording device, said at least one recording device comprising a database, said recording device operable to receive said acknowledgement message and store said acknowledgement message in said database.

According to a fifth aspect of the present invention, there is provided a user portable mobile wireless communications device, comprising:

a main body;

an electrical power source;

wireless communication signal transmission and receiving means;

said communications device characterised in that:

said device is configured to receive wireless communications signals from a second wireless communications device where said device encounters said second device by being located within a predetermined distant of a said second wireless communications device for a pre-determined amount of time; and said wireless communications device is configured to create a record of an encounter with said second wireless communications device.

According to a sixth aspect of the present invention, there is provided a database device for storing a plurality of records, each record describing an encounter between a mobile wireless device and at least one other wireless device, said database device comprising:

at least one data processor;

at least one data storage device for storing a plurality of data records; and at least one input/output port for enabling access to said database records, said device arranged for storing data of the following types, data identifying at least one said mobile wireless device;

data describing said at least one other wireless device.

According to a seventh aspect of the present invention, there is provided a method of operating a mobile wireless communications device for reporting encounters of said device with at least one other wireless device, said method comprising:

receiving a proximity signal from said at least one other wireless device, said proximity signal comprising data identifying said at least one other wireless device, said proximity signal being received when said mobile wireless device is within a pre-determined range of said at least one other wireless device; and storing a record of said proximity signal in a data storage device.

According to an eighth aspect of the present invention, there is provided a method of operating a data recording apparatus for creating a register of encounter records, each said encounter record describing an encounter between a mobile wireless device and at least one other wireless device, said method comprising:

receiving an encounter message describing an encounter between said first mobile wireless device and said at least one other wireless device;

storing said encounter message in a database;

Other aspects according to the invention are as recited in the claims herein.

BRIEF DESCRIPTION OF THE DRAWINGS

For a better understanding of the invention and to show how the same may be carried into effect, there will now be described by way of example only, specific embodiments, methods and processes according to the present o invention with reference to the accompanying drawings in which:

FIG. 11 illustrates schematically one example of a configuration of a database comprising a recording device.

DETAILED DESCRIPTION

Figure 1:
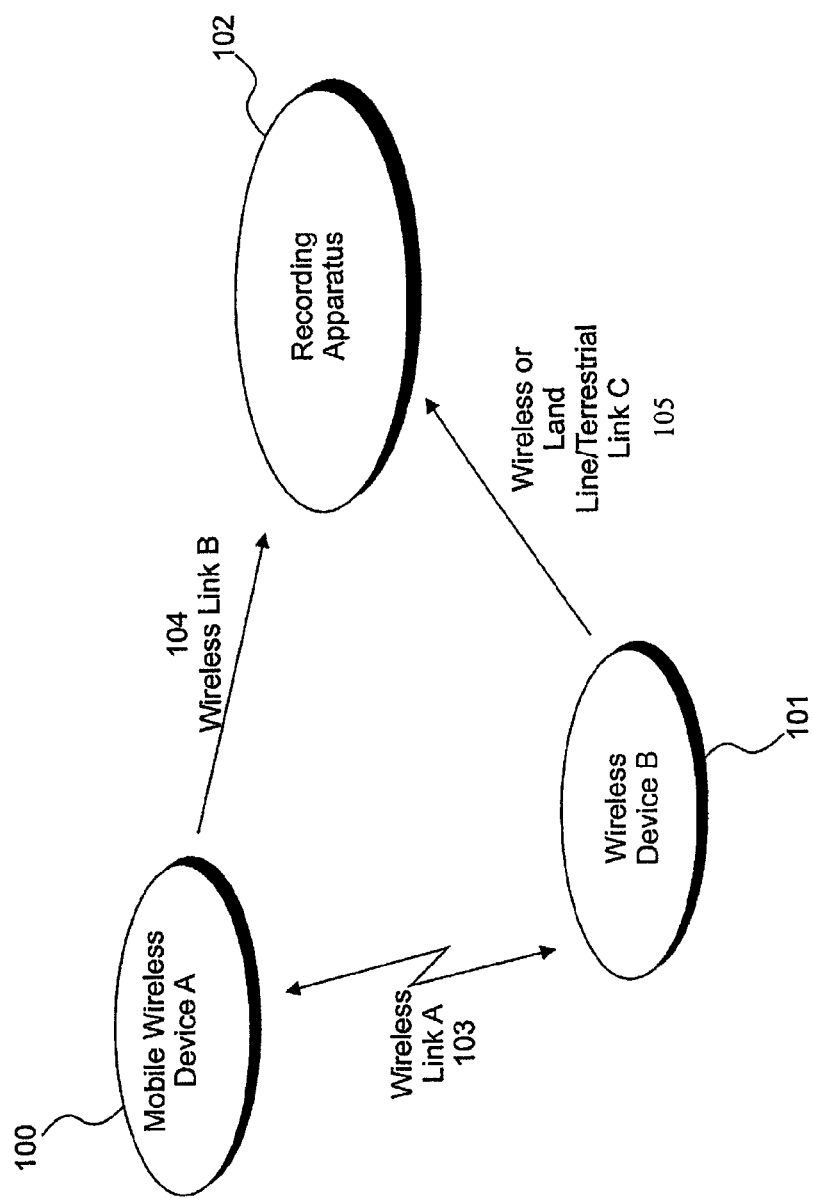
FIG. 1 illustrates schematically in general logical form an encounter recording system according to a first specific embodiment.

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

In this specification, the term "encounter" when referring to a plurality of digital electronic devices means that a digital electronic device has been placed within physical proximity to another digital electronic device within a predetermined range, such that signals are transmitted and/or received between the two devices. An encounter may be an acknowledged encounter, that is an encounter whereby an acknowledgement protocol transmitted and received between the two devices has been completed, or the encounter may be an unacknowledged encounter, in which case either no acknowledgement protocol has been initiated, or an acknowledgement protocol may have been initiated, but not completed.

In this specification, the term "acknowledged encounter" means an encounter between two digital electronic devices, in which an acknowledgement protocol has been completed between those two devices.

In this specification, the term "unacknowledged encounter" means an encounter between two or more digital electronic devices, in which an acknowledgement protocol has not been completed between those devices.

In this specification, the term "data storage device" means any device capable of storing electronic data whether in digital or analog form, and includes unparticular devices of the following type: solid state memory devices; rotating disc data storage devices; USB memory sticks; CD ROM discs; DVD discs/storage media; tape data storage devices, for example digital linear tape (DLT); and/or digital data storage (DDS) devices, and like devices.

In this specification, the term "handshake" means reception by a first wireless device of a transmission made by a second wireless device, irrespective of whether or not the second wireless device receives a transmission from the first wireless device. The term "handshake" includes both situations where one wireless device receives a transmission from another wireless device without the reverse situation being true, i.e. without the other wireless device receiving a wireless transmission from the one wireless device, as well as the situation where both wireless devices receive wireless transmissions from each other. Whichever wireless device is capable of detecting the other, if that device receives and recognizes a signal transmitted from the other device, then this constitutes a handshake within the meaning of the term in this specification.

The use of personal mobile digital electronic devices such as mobile telephones, personal digital assistants (PDA's) portable laptop, pocket book or notepad type computers, having wireless communication capability is becoming ever more common. Further, new types of personally portable computers such as clothing having wearable computers, with wireless communication facility are also emerging. Additionally, the invention may be applied to other personal mobile digital devices including but not limited to Blackberry devices, MP3 players (and other music players), navigation devices and any other similar such device that may be developed.

The inventor has identified that in general, persons treat such mobile devices as being personal to themselves, and that there is a strong correlation between the location and whereabouts of such personal wireless communicable computing devices and an individual person to whom those devices belong.

The correlation between the physical locations of personal digital devices and their users or owners is not absolute, for example a person may have more than one mobile phone device which they use on different days, or more than one PDA device and may carry only one device at once. Further, persons may leave their mobile phone device at home whilst going out, and need not carry the device with them all the time.

Nevertheless, the degree of correlation between the locations of such personal digital devices and their users and/or owners, is strong enough to make information about the experiences and encounters of those personal mobile digital devices give useful information about the encounters, experiences and/or whereabouts of their user or owners.

The present specific embodiments and methods provide unique methods and apparatus for recording an encounter or a series of encounters that a mobile personal wireless device has experienced, with one or more other digital wireless devices.

First and second wireless devices encounter each other over a relatively short range wireless link, typically in the range 2 cm to 100 m. one or both of those devices may generate an encounter message and make a record of the encounter, either on board the device itself, or transmit the encounter message to a remote recording apparatus where it is stored. Transmission of the encounter message to the remote recording apparatus may be made over a relatively longer range wireless link, for example a wireless link having a range up to 10 km.

According to specific embodiments disclosed herein, a register of persons who have been in close physical proximity to each other may be compiled. The register is based upon a collection of proximity messages, collected from a plurality of devices which have encountered the mobile device. A proximity message is generated each time a particular mobile wireless device carried by a person, is in proximity to another mobile wireless device, or a static device, which is capable of conducting a wireless handshake procedure with the mobile device.

With a preferred embodiment a digital electronic device is provided that is configured to communicate with another digital electronic device such that a record of the communication is made. In a preferred embodiment the record of the communication is then forwarded to a remote storage device for later use. In the preferred embodiment, the communication may take the form of an exchange of signals, such that each device acknowledges the other device. Such an exchange, termed a "handshake" may occur such that a first device handshakes with another device and one or both devices then forwards a record of the handshake to a remote device that is configured to store data indicating that the handshake took place. By handshake it is meant a wireless communication between the two devices wherein acknowledgement of each device's presence with respect to the other device is provided.

Where a mobile wireless device encounters another wireless enabled device, and sends and/or receives communications to or from that other device, then the two devices can either conduct a handshake protocol in which each device acknowledges the existence of another, or depending upon the relative transmission and reception ranges of each device, one device may detect the other, without being detected itself. In either case, either device may receive signals from the other device periodically, intermittently, or substantially continuously over a period. Either device may make a record, identifying a first time at which contact was made with the other device, a final time (end time) at which the latest contact was made with tie other device, and may make a record of the duration over which the two devices remained in contact with each other, within the range of a short range wireless reception field of the device. Therefore, the information recorded may not only include the fact that one device had encountered another, but may also include the information that two devices had encountered each other, and also a time duration over which one device encountered another, or both devices encountered each other.

In the best mode the present application concerns mobile wireless devices such as, but not limited to, mobile telephones, personal digital assistants (PDA's), private mobile radios (PMR's)/utilities and two-way radio/networked radio devices; lap top computers; MP3 players; gaming devices; Blackberry devices; and wearable computers and the like. Such devices are capable of exchanging information, such as for example data packets, between each other to register that those two devices have been in close proximity with each other.

However various methods of communication may be used to perform the acknowledgements. Examples include infrared communication, Bluetooth type communication, Wi Fi exchanges, or other radio transmissions. The devices may be configured to communicate over set ranges. In one embodiment, close proximity may mean, in the example of a pair of mobile telephones, within two meters and for a duration of two minutes. In such an embodiment, if these parameters are met then a handshake would be configured to take place, after which a record of the handshake is communicated to a network provider or some other remote data storage center, which complies a register of encounters of the mobile device.

The communication of handshake type information to a given telecommunications network could be configured to operate by one of several methods including, for example, text type communication using text or wireless application protocol (WAP) or a General packet radio service GPRS data call.

A mobile wireless device, such as a mobile telephone, could also be configured to communicate with a device that is either static and/or mobile. One example of a static device would be a device configured at an entry point of a building which has been fitted for the intended purpose of handshaking or otherwise communicating with one or more types of passing mobile devices. Such static device may provide an improved level of security for official buildings and high risk places such as airports, banks and law courts.

In a preferred embodiment there is compiled a remote register of persons that have been in close proximity with each other. Such a system could identify witnesses and/or suspects. Thus if a given person has been attacked and that person was carrying a mobile device as described herein, then the register of the encounters of that device would enable the authorities, such as the police force or a national criminal intelligence service to be able to potentially more readily identify persons whom are most often in contact with a given victim.

Whilst in the preferred embodiment, a register of encounter records is compiled at a remote register, in other embodiments, the recording apparatus may be integrated with a mobile wireless device or a static wireless device itself. For example, the register could be stored on an internal memory or data storage device on a mobile phone. Alternatively, the register of encounter records could be stored on a data storage carrier such as a SIM card.

More general uses of the invention include such matters as registering pupils in attendance at a class at school, monitoring the attendance of workers in an employment situation or monitoring patients/visitors in a hospital or other care facility.

Similarly embodiments of the invention could be used for the tagging of suspected criminals, convicted criminals and for purposes of providing protection to witnesses.

In an embodiment configured for use as a witness compiler, there may be complied a list of persons who may be able to assist in intelligence gathering, this being particularly advantageous in criminal investigations where frequently persons do not volunteer themselves in evidence. This may aid in revealing such persons to the police whereas they might have otherwise gone unnoticed.

Specific embodiments described herein disclose a method by which private mobile wireless devices, particularly, but not exclusively mobile phones, personal digital assistants (PDA), PMR/Utilities, two way radio devices, network radio devices, Blackberry devices and the like may exchange data packets between each other so as to register that those mobile devices have been in close physical proximity with each other.

A mobile device may communicate either with another mobile device or with a static device, for example a device placed at an entry point to a building such as a government building, official building, airport, bank, court room or the like.

Referring to FIG. 1 herein, there is illustrated schematically an underlying apparatus and method of operation of an encounter recording system. The system comprises a mobile wireless device 100, a second wireless device 101; and a recording apparatus 102, each shown as logical entities in FIG. 1. In FIG. 1, in the interests of clarity, there is illustrated the mobile wireless device 100 encountering a single other wireless device 101. However, it will be understood that there may be many other wireless devices in an environment which the mobile wireless device 100 may encounter, either individually, or simultaneously, two or more at a time. Further, encounters experienced by the mobile wireless device 100 may be recorded by one or more recording apparatus.

The mobile wireless device 100 may roam over a wide range of geographical locations, and continuously or intermittently, or in any combination of continuous or intermittent transmissions, searches for other wireless devices.

Second wireless device 101 may be either a mobile wireless device, or a static wireless device positioned in a fixed location. Second wireless device 101 communicates with a mobile wireless device 100 over a first wireless link 103 whenever the mobile wireless device 100 and the second wireless device 101 are within a pre-determined range (which may be the full range of the wireless link or may be a restricted range, if desired) of each other for a predetermined time.

A minimum pre-determined range may be determined as the minimum range between the mobile wireless device 100 and second wireless device 101 which enables those two devices to complete an acknowledgement protocol between the devices. Typically, the acknowledgement protocol may be in the form of a "handshake" protocol. The maximum pre-determined period maybe a period which is pre-set into either the mobile wireless device 100, or the second wireless device 101.

Second wireless device 101 is capable of communicating with the mobile wireless device 100 over a first wireless link 103. The second wireless device 101 is capable of communicating with the recording apparatus 102 over a third communications link 105 which may either be a wireless link, a conventional land line link, or a combination of wireless and land line links, as is known in the art.

Mobile wireless device 100 is capable of communicating with second wireless device 101 over a first wireless link 103, and is capable of communicating with recording apparatus 102 over a second wireless link 104. Recording apparatus 102 may be provided anywhere within a network.

Data may be carried between two devices by any suitable wireless s technology, for example wireless signals or infrared signals.

Wireless Link A

The first wireless link between the mobile wireless device and the other wireless device may be any known local wireless link type whereby the two devices may communicate over a relatively short range. By short range it is meant in the range 0-100 meters. Examples of technologies which allow communication over such distances include the known Bluetooth® technology, details of which are available at www-.Bluetooth.com. The known Bluetooth protocol is a low speed short range wireless protocol operating at approximately 2.4 OHz. Bluetooth communications typically operate on transmitted powers of mW, in order to avoid interference with other devices operating in the 2.4 OHz band. Additionally, Bluetooth technology uses spread spectrum hopping, which allows frequency hopping within a pre-defined range of frequencies, again for the purpose of avoiding interference with other devices operating in the same frequency band.

Bluetooth devices may operate to detect each other where those devices are placed within a pre-determined distance from each other. Devices are identified by using a defined range of MAC addresses. Upon encountering each other, first and second Bluetooth enabled devices may create a "personal area network" according to the Bluetooth protocols. Two or more Bluetooth enabled devices may join the same personal area network and communicate with each other.

Typically, the distance ranges within which Bluetooth enabled devices may encounter each other depend upon the device power class of the Bluetooth device. Examples of these are given as follows:

| Device Power Class | Max Output Power (mW) | Max Output Power (dBm) | Expected Range |
|---|---|---|---|
| Class 1 | 100 mW | 20 dBm | 100 m |
| Class 2 | 2.5 mW | 4 dBm | 10 m |
| Class 3 | 1 mW | 0 dBm | 10 cm |

Of course, it is possible that the implementation of the invention may be best achieved using a different power class of Bluetooth device and accordingly the invention should not be considered to be restricted to use of Bluetooth devices of the power classes specified above or to ranges equal or equivalent to those above which are specified by way of example only. Indeed, in the present invention, a device may be set up to operate with a particular range but in the event that no other devices are detected within that range may switch to a longer range.

In other embodiments, a conventional infra-red link may be used, and an acknowledgement protocol may operate between two devices over the infra-red link.

Other examples of short range wireless links include the known "radio link" type communications, and WI FI systems. Wi Fi systems operate at frequency bands centered around 833 Mhz, and 1400 Mhz. Alternatively, the short range wireless link may comprise a WiMax link.

WiMax has a potential reach of approximately 50 km. A WiMax cell can support aggregate band widths of up to 70 Mbit/s with per user bang widths of up to 1 Mbit/s per second. Users are able to move around and still maintain wireless contact. WiMax operates on an Orthogonal Frequency Division Multiplexing (OFDM) transmission system. WiMax is derived from standard IEEE 802.16, and operates in a range of frequencies between 2 OHz and 11 OHz. Typically, known WiMax technology operates at around 2.4 OHz and 5 OHz.

Alternatively, the short range wireless link may be based upon the standard IEE 802.20, known as MobileFi, which is capable of providing 1 Mbit/s per second for individual users and aggregate data rates of up to 30 Mbit/s per second for users in each MobileFi cell. MobileFi is capable of recording encounters at relative speeds of up to 250 km/hour with current implementation speeds of up to 150 km per hour being successfully tested. Mobile Fi operates in authigonal frequency division multiplexing (OFDM) and is suitable for high mobility applications, for example usage on trains, or travelling vehicles. Mobile Fi has a potential range radius of around 15 km.

Alternatively, the short range wireless link may comprise an IEEE 802.11 n base network, operating at a minimum data rate at around 100 Mbit/s per second and up to 500 Mbit/s per second. Such systems are currently under development from the consortiums TGN Sync and WWISE.

As another alternative, the short range wireless link may comprise an ultra-wide band (UWB) communications link. UWB links promise high band with low power levels. UWB signals may be spread across a band width of approximately 1 Ghz or more and so far is approved for use in the US for indoor and short range outdoor communications in a band which extends from about 3 GHz up to about 10 GHz. Current proposals under the IEEE 802.15.3 working group divide a 7 GHz band into 500 MHz chunks, allowing for communications of up to 480 Mbit/s per second at a distance of approximately 1 m. An alternative UWB proposal from Freescale Semiconductor may also be used as the wireless short range link.

As yet a further alternative, the short range wireless link may be provided as an IEEE 802.15.4 ZigBee system. This system is aimed at home automation and can operate in the 2.4 GHz band, and operates data rates of 200 Kbit/s at a range of up to 100 m.

Wireless Link B

The second wireless link 104 between the mobile wireless device and the recording apparatus may consist of any short or long range wireless link. For example the wireless link may comprise a conventional mobile telephone wireless link such as a Groupe Systeme Mobile (GSM) link or a Code Division Multiple Access (CDMA), or a Wireless Access Protocol (WAP) link, or the like. The link may make use of a conventional communications network, such as a mobile network, the internet and/or a public service telephone network (PSTN) in order to connect the mobile wireless device with the recording apparatus.

By "longer range", it is meant a wireless link having a range of up to 50 km or more.

In one embodiment, an encounter message may be sent from a wireless device, which is party to an encounter to a recording apparatus over a general packet radio service (GPRSj link. GPRS is a standard for wireless communications, which operates at around 150 Kilobits/sec. GPRS is well suited for sending and receiving small bursts of data in packets. Consequently, in some embodiments the encounter message may take the form of an e-mail, transmitted over a GPRS link, where the e-mail is broken down into constituent packets of data.

In other embodiments, the encounter message may be created in the form of an SMS message, which is transmitted over a conventional wireless network SMS messaging service to a pre-determined address at which the recording apparatus is resident.

Link C

The third link 105 may comprise any conventional communications link between the other device 101 and the recording apparatus 202. For example where the other device is itself a mobile telephone, the third link 105 may consist of a wireless link to a local base station using one of the conventional mobile phone technologies e.g. GSM, WAP, CDMA. The mobile phone network base station may then communicate with the recording apparatus 102 through any conventional communications network e.g. a mobile phone network, the internet, a wide area network (WAN), or a conventional public service telephone network (PSTN).

In the general case, the recording apparatus 102 may be placed either close to or remotely from either the mobile wireless device or the other wireless device 101. The recording apparatus 102 may be provided at a telephone exchange connected to a telephone switch or may be provided as a remote server having its own logical address.

Whilst the first wireless link 103 has a range of the order of tens of meters, the second and third links 104, 105 are unrestricted in range, and may be up to several thousand kilometers in distance.

Performing a registration of a record of whenever two mobile devices are in close proximity to each other may be effected by a variety of specific methods, some of which may use conventional protocols. In one example, a data packet may be used in a handshake protocol. In other examples, the known Bluetooth technology may be used to register that two or more devices have been in proximity to each other.

In general terms, when first and second wireless devices are within close physical proximity to each other for a pre-determined time period, where the range of proximity and the time period for which the wireless devices are within that range are parameters which can be defined by an operator of the system and/or a user of individual mobile devices, then a record is made that those devices have been in physical proximity to each other. This may be effected by the two wireless devices communicating with each other, typically using a hand shake protocol. Once a hand shake message exchange is acknowledged and/or confirmed by one or both devices, a record of the handshake may be communicated to a network service provider or some other remote storage center. Communication of the proximity acknowledgement may be made by a variety of conventional means, for example a text message, a WAP (Wireless Application Protocol) communication, a GPRS message, or a conventional data call.

When first and second wireless devices are within range of each other, they may continue to exchange handshake messages continuously or intermittently over a period within which the two devices are each within range of their respective short range wireless reception fields. In other words, whenever the two short range reception fields of the two wireless devices overlap, then handshake signals may continue to be exchanged. A record of the encounter between the two devices may record the start, finish and/or duration of the time period over which the two wireless devices were in range of 2-way communication with each other.

Transmission of record messages from the mobile wireless device 100 to one or more recording apparatus 102 is desirable, because it means that the register of encounter records is not physically dependent upon the mobile wireless device itself for its existence. This means that if the mobile wireless device is destroyed, the register of encounters of that mobile wireless device will survive, because it is stored on a separate recording apparatus, remote from the mobile wireless device.

In some embodiments, a collection of records of encounters of the mobile wireless device may be stored on the mobile wireless device itself, in addition to storage of those records on one or more remote recording apparatus 102.

Figure 2:
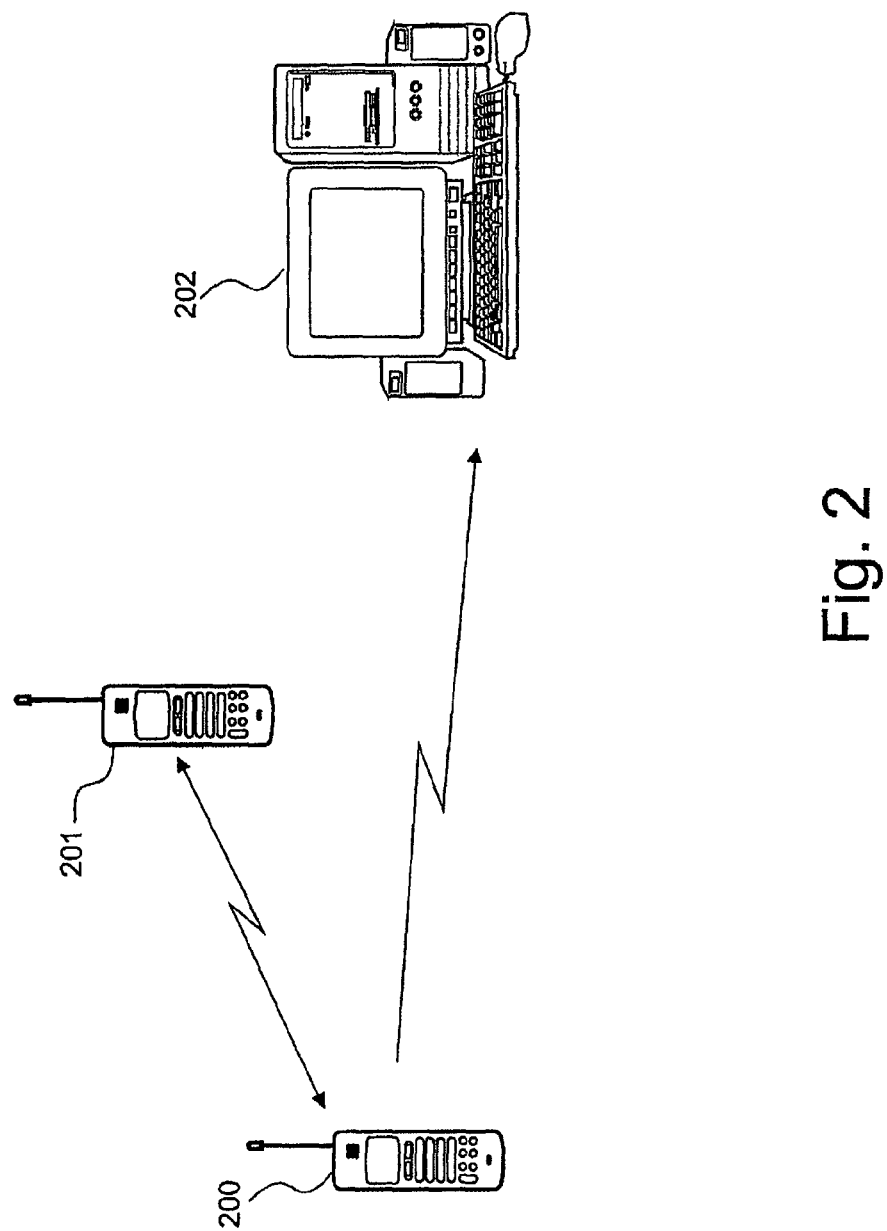
FIG. 2 illustrates schematically a second encounter recording system according to a second specific embodiment and a second specific method.

Referring to FIG. 2 herein, there is illustrated schematically a second specific embodiment and method of operation of an encounter recording system.

The apparatus comprises at least one mobile device 200; at least one other wireless device 201, which may be mobile or static; at least one database 202, which may be provided remotely from the mobile wireless device and/or other wireless device; and a communications network (not shown in FIG. 2).

An example of an encounter between wireless mobile device 200 and other wireless device 201 may be as follows.

The mobile wireless device 200 roams about over an area. The other wireless device 201 maybe a mobile device, also roaming around over an area, or it may be a static device fixed in a particular location. Mobile wireless device 200, and the other wireless device 201 are each adapted to be continuously and/or intermittently searching for other devices within a predetermined distance range. When the mobile wireless device 200 encounters the other wireless device 201, that is, the two devices encounter each other within the pre determined range, the two devices detect each other and commence an acknowledgement protocol, in the form of a handshake protocol. In this embodiment, the mobile wireless device 200, having completed the handshake protocol, transmits an acknowledgement message via a communications network, to the remote recording device 202. The acknowledgement message contains details describing the encounter between the mobile wireless device 200 and the other wireless device 201. The recording device 202 records details of the encounter as an entry in a register stored on a database device.

Figure 3:
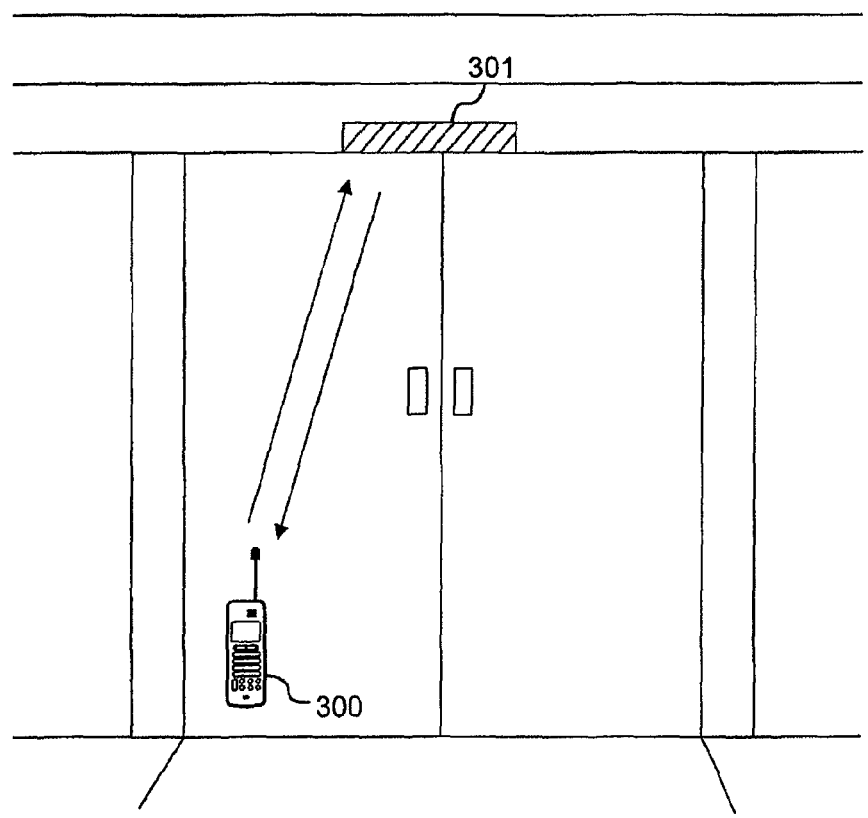
FIG. 3 illustrates schematically an encounter between a mobile wireless device and a static wireless device fixed at an entrance or exit of a building o according to the second specific embodiment.

Referring to FIG. 3 herein, there is illustrated schematically an encounter between a mobile wireless device 300 and a statically fixed wireless device 301. The statically fixed device 301 is positioned at an entrance/exit doorway of a building. Whenever a mobile device 301 approaches within a predetermined range of the static wireless device 301, and remains there for a pre-determined period, an acknowledgement exchange is carried out by the mobile device and the static device. Once an acknowledgement has taken place, either the mobile device 300 or the static device 301, or both devices, may report detail of the encounter to a recording apparatus, resulting in a record of the encounter between the mobile device and the static device being recorded by the recording apparatus.

Figure 4:
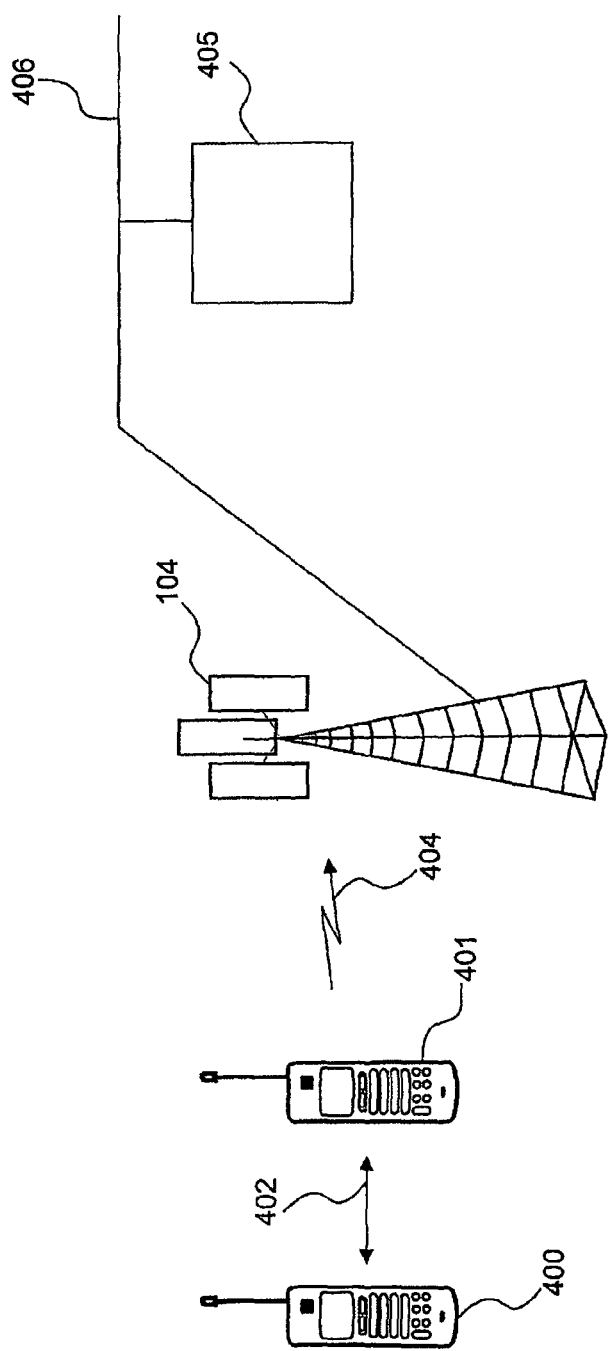
FIG. 4 illustrates schematically one example of reporting an encounter between first and second mobile wireless devices to a remote recording device according to the second specific method; 5

Referring to FIG. 4 herein, there is illustrated schematically an encounter between first and second mobile wireless devices 400, 401 respectively and reporting Of that encounter over a communications network to a remote recording apparatus 405.

First and second persons respectively carry first and second mobile 5 telephone devices 400, 401. When those persons encounter each other, then mobile telephone devices automatically detect that they are in each others presence. That is, the mobile telephone devices acknowledge that they are in each other presence, using a hand shake protocol as described herein over a localised wireless link 402. The range within which the two mobile devices must encounter each other, and the time period over which those two mobile devices must stay within that range are variable parameters which can be set by an operator of the system or which can be pre-set in hardware or software, embedded into the apparatus. Having acknowledged that the first and second mobile devices have encountered each other, a report message of that encounter is transmitted to the remote recording apparatus 405. In the example shown, second mobile device 401 transmits a report message over a wireless link to a mobile base station 403. The message is sent over a conventional communications network, represented as a channel 406 to the remote recording apparatus 405, where details of the encounter are stored in a database resident on a data storage device.

Figure 5:
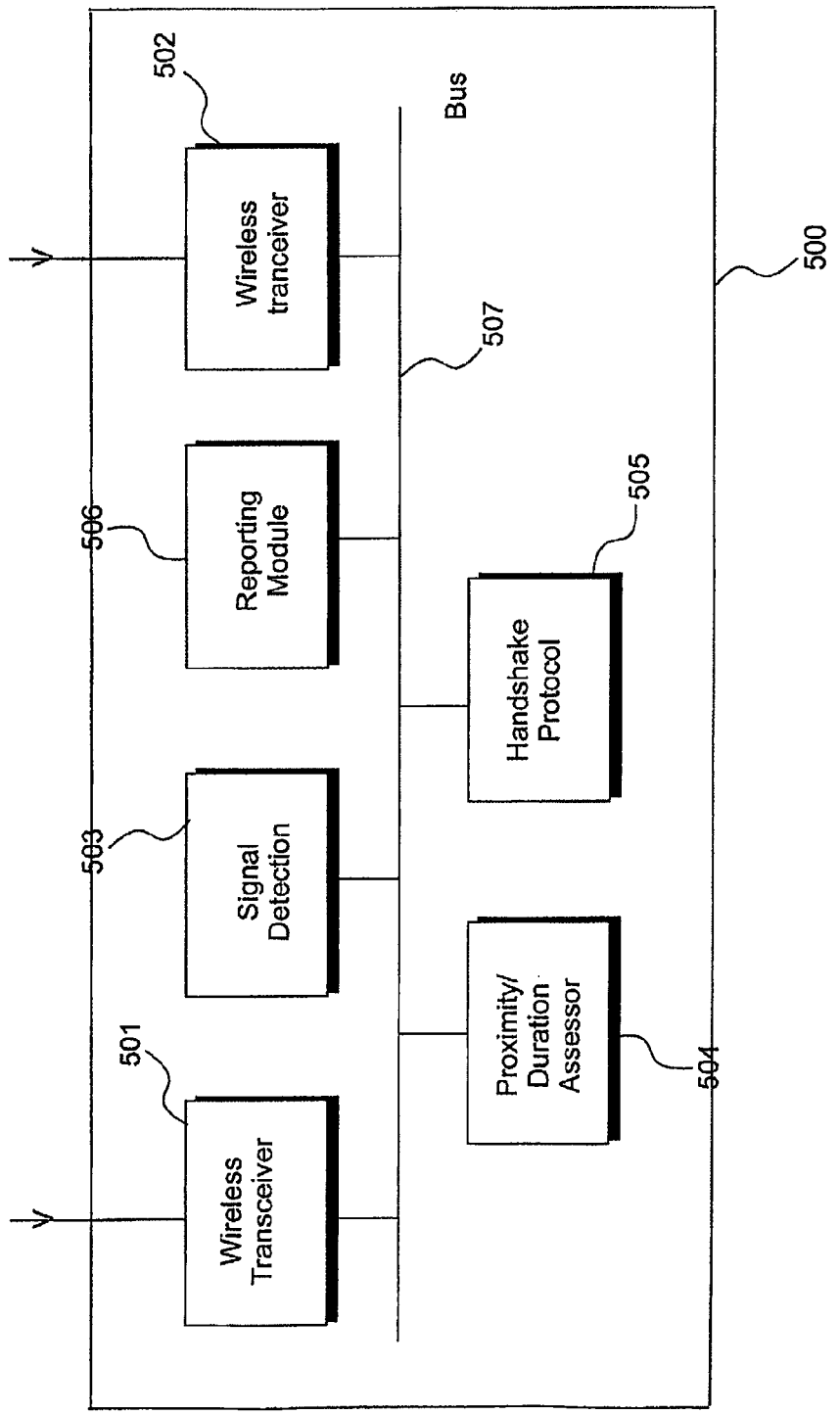
FIG. 5 illustrates schematically components of a mobile wireless device configured for operating according to a specific method disclosed herein.

Referring to FIG. 5 herein, there is illustrated schematically components of a mobile wireless device 500. It will be understood by those skilled in the art that the mobile wireless device could be any one of a range of conventional devices, adapted by incorporation of the components as described in FIG. 5 herein. Examples of such conventional devices include conventional mobile phone handsets, conventional blackberry devices, conventional personal computers such as laptop computers, notebook computers or the like, or conventional personal digital assistants (PDAs).

The device comprises a first wireless transceiver 501 having a relatively longer range, for example a conventional GSM or CDMA wireless transmitter/receiver. For communicating with a wireless base station; a second wireless transceiver 502 for transmitting and receiving over a relatively short range wireless link, for example a Bluetooth link or the like, and over which an acknowledgement protocol is transmitted and received when the device is within range of another wireless device; a signal detection component 503 for detecting 5 when the wireless device is within range of another wireless device equipped with a short range wireless transceiver; a proximity and/or duration assessment component 504 for monitoring how long the mobile device is within range of another wireless device, that is within range of the short range wireless communications link, and for determining whether the mobile wireless device is I o within range of that other wireless device for a time exceeding the pre-determined time duration, and, if so, to initiate exchange of signals between the mobile wireless device and the other wireless device for acknowledging that there is an encounter between the two devices. An acknowledgement protocol component 505 for operating an acknowledgement protocol between the mobile wireless 15 device and the other wireless device; and a reporting component 506 for generating a message describing the encounter between the mobile wireless device and the other wireless device, and sending that message to the first wireless transceiver 502 for transmission to a remote recording apparatus.

It will be appreciated by the person skilled in the art that the components of the mobile wireless device may be implemented by means of a general purpose computer consisting of a data processor, an associated memory, a power supply, a data bus, and optionally a data storage device. In the case of a general purpose computer, the functionality provided by the modules shown in FIG. 5 may be provided in the form of code instructions, that is, a computer program, for operating that general purpose computer, where the computer program is stored on a data carrier, for example within the data storage device, within the memory device or as a separate plug in data carrier e.g. a SIM card, a USB memory stick or equivalent data carrier.

In alternative embodiments, the components described in FIG. 5 may be implemented as dedicated hardware, for example in the form of an application specific integrated circuit (ASIC).

In the general case, the functionality described herein may be configured into a mobile wireless device or other wireless device in the form of dedicated hardware, a software such as downloadable code stored on a data storage carrier comprising the device, or as firmware, being a hybrid hardware/software solution. This applies equally to the functionality for operating and configuring the mobile wireless device or other device, as well as to the recording apparatus, where the recording apparatus comprises the mobile wireless device or the other device itself.

Figure 6:
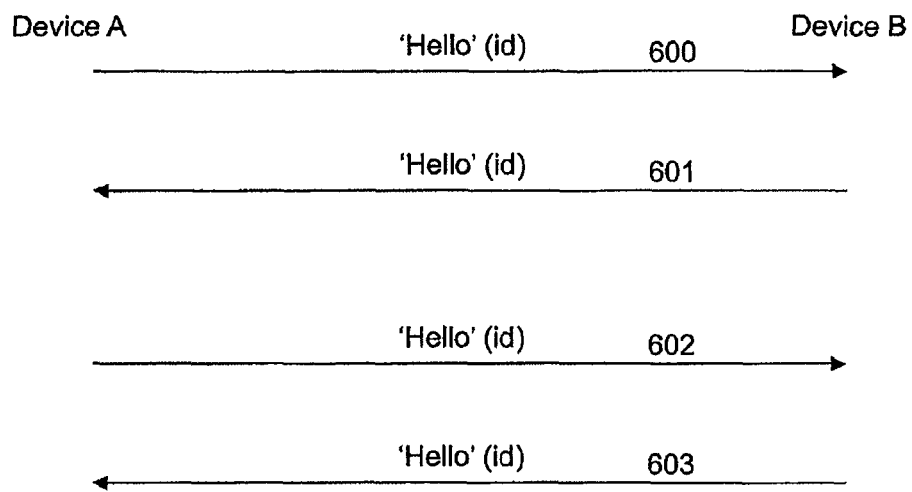
FIG. 6 illustrates schematically communications between first and second 0 wireless devices for making acknowledgement that the devices are in physical proximity to each other, according to a specific method described herein.

Referring to FIG. 6 herein, there is illustrated schematically proximity signals transmitted and received between first and second wireless devices A, B respectively for acknowledging an encounter between the two devices. The proximity signals may contain proximity messages. First wireless device A continuously or intermittently sends out wireless signals either directionally, but preferably omni-directionally from its transceiver. When second device B is within a pre-determined range of the first device A, such that it can receive and decode the transmitted proximity signal(s) 600 from device A, then the second device B sends its own proximity signal 601 which identifies device B.

Device A repeats sending of its own proximity signal either continuously, or at regular intervals, resulting in at least one other proximity signal 602 broadcast by the first device A. Each time the second device B receives a proximity message from the first device, it may send in return a response proximity message 603.

Consequently, as long as first and second devices A, B respectively are within transmission and reception range of each other, which is a function of the directionality of the antennas of each of those devices, the sensitivity of the transceivers of those devices when in reception mode, and the power of the signals transmitted by each device, then the devices may continue to exchange proximity messages with each other.

Handling of those proximity messages by each device, then depends upon the programming and internal configuration of how each of those devices are set up to record and/or report encounters with other devices.

Acknowledged Encounters

First and second devices A, B respectively may be set up to only record and/or report encounters with other devices which are acknowledged. In an acknowledged encounter, a protocol may be completed in which each device acknowledges an exchange of signals with the other device. Therefore, referring again to FIG. 6, in an acknowledged encounter, device A broadcasts a first proximity signal 600, which is detected by device B. Device B may acknowledge receipt of that proximity message by broadcasting its own proximity message 601, which is detected by first device A. At this stage, second device B is aware of first device A, and first device A is aware of second device B, but second device B is not aware that first device A is aware of second device B. Therefore, first device A sends a third proximity message 602, which may identify second device B. The information identifying second device B is contained in the second proximity message 601 sent from second device B to first device A. First device A may parse the second proximity message 601 to obtain the identification data of second device B. That data may then be included in the third proximity message 602 sent from first device A to second device B. When second device B has received the third proximity message 602 (being the second proximity message transmitted by first device A), since this proximity message includes device B's own identification data, this confirms to device B that device A has received device B's proximity message 601. Therefore, at this stage each of the first and second devices can confirm that the other device has acknowledged an encounter.

The time scale of the acknowledged encounter described above corresponds to the time taken for the exchange of the proximity messages by the two devices. The above acknowledgement protocol requires a time period to complete, no shorter than the time necessary for first device A to send the first proximity message, second device B to receive that proximity message, and broadcast a proximity message (the second proximity message 601) in return, and for the first device A to receive that second proximity message and broadcast a confirmation of that proximity message (the third proximity message 602). It would be appreciated by the person skilled in the art that each of the first, second and third proximity messages 600, 601, 602 respectively may be transmitted multiple times and both device A and device B may transmit in parallel, so that transmission may occur asynchronously, so that each of the first and second devices A, B are transmitting and receiving without syncronisation with each other.

In other variations, the protocol may include synchronous exchange of proximity messages, that is, second device B waits until it has received first proximity message 600 before transmitting second proximity message 601, and first device A waits until second device B has terminated transmission before sending any further proximity messages. Synchronous transmissions may be effected by means of known token protocols, or by protocols such as those embedded within the Bluetooth standards.

Extended Acknowledged Encounter

Each of first and second devices A, B respectively may be set up to report encounters which last longer than a pre-determined time, where encounters lasting more than that time will be reported to a recording apparatus. The predetermined time set for each device may be different. Referring to the acknowledged encounter protocol above, where three proximity messages are exchanged, in a timed acknowledged encounter, a first hand shake comprising the first to third proximity messages may occur at a first time, and then after a pre-determined wait period, which must extend up to the longest pre-determined wait period of either the first device A or the second device B, then the hand shake may occur again, by repetition of an exchange of proximity messages. Therefore, in this timed encounter where the time period of the encounter is equal to or greater than the longest pre-programmed wait period for either device A or device B, there may be hand shake exchanges at the start of the wait period, and at the end of the wait period, or after the end of the wait period.

Both the first device A and/or the second device B may report an encounter message to a remote recording apparatus.

One Sided Timed Acknowledgement

Where first device A and second device B each have pre-stored pre determined times for which they will report encounters which last beyond those pre-determined times, there may be situations where one device may report an acknowledged encounter, but the other device may not, because the criteria for reporting or acknowledging an encounter depends upon the predetermined period and that period is different for each device.

Therefore, for encounters which extend beyond the pre-determined period of first device A (being in this example, the shorter period), but do not extend for as long as the pre-determined period for device B (in this example being the longer period), then only the first device A may report that encounter as an acknowledged encounter. Such an encounter may be unilaterally reported to a recording device by one device party to the encounter.

Bilaterally Confirmed Timed Encounters

In situations where an encounter between first and second devices A, B extends over a time period which is longer than the pre-determined time periods for each of first device A and second device B1 both the first and second wireless devices A, B respectively, may each independently report the encounter to a remote recording apparatus and/or store a record of the encounter locally. This type of encounter is therefore verified by both devices.

That is, the fact that both devices were within physical proximity of each other, i.e. within a pre determined distance, over a pre-determined period, where that pre determined period satisfies the criteria of the pre-determined period programmed into each wireless device, is confirmed by both wireless devices to one or more recording apparatus.

Unacknowledged Encounters

An unacknowledged encounter may occur where first and second devices A, B respectively are within sufficiently close proximity of each other, that one of the devices A or B receives a signal from the other one of the devices, but the other one of the devices is out of range, or does not receive a proximity signal.

In this example, for example device A may broadcast first proximity message 600 which is received by device B. However, the second proximity messages 601 broadcast by device A may be out of reception range of first device A, therefore first device A never becomes aware of the proximity of second device B. Second device B may report its encounter with first device A as an unacknowledged encounter. First device A on the other hand is completely unaware of the existence of second device B. Therefore, one of the devices becomes aware of the other device within its proximity, but that other device does not become aware of the first device. Therefore, whilst a hand shake as defined hereinbefore has taken place, the full hand shake protocol cannot take place and thus there can be no acknowledgement between the two devices that they are within each others physical presence. However one of the devices does have the knowledge that it received a message from the other device. This type of encounter may be reported as an unacknowledged encounter by the device which detects the proximity signal.

Since this type of encounter is not acknowledged by both wireless devices, it could be treated as less reliable information of an encounter than an acknowledged encounter.

In a variation of an unacknowledged encounter, a device may only report the unacknowledged encounter where that encounter lasts for a pre-determined time period, pre-programmed into the device. For example device B may need to continuously receive a series of proximity messages from device A over a predetermined time period, for example over a period of a minute or two minutes before reporting that encounter as an unacknowledged encounter. The predetermined time period is user definable and may be programmed into second device B. Therefore, even if there is enough time to complete a hand shake protocol, the encounter is reported as unacknowledged because the encounter did not last for the specified minimum time duration.

Reporting of Encounters

Each wireless device may be set up to report encounters with other wireless devices, according to its own internal reporting configuration. Examples of reporting configurations include the following:

In a first configuration, a device may report an encounter as soon as a signal is received from another device.

In a second configuration, a device may report an encounter only after a two way acknowledged handshake has been completed with another wireless device.

In a third configuration, a device may report an encounter only after a signal is received from another wireless device and is continued to be received over a pre-determined period programmed into the wireless device.

In a fourth configuration, a device may report the encounter only after handshake contact has been maintained with another wireless device over a pre-determined period.

It will be appreciated that, where two wireless devices are each configured to report an encounter, but are configured differently to each other, then the encounter may be reported differently by each wireless device. That is, for example where a first wireless device is configured to report an encounter every time a handshake signal is exchanged with another device, that may result in a series of individual encounter messages being sent from the wireless device, one per individual handshake. On the other hand, the other (second) wireless device may be configured to report a sequence of handshakes as a single encounter, lasting over a time period over which the two devices were within reception and transmission range of each other and able to exchange handshake signals.

Figure 7:
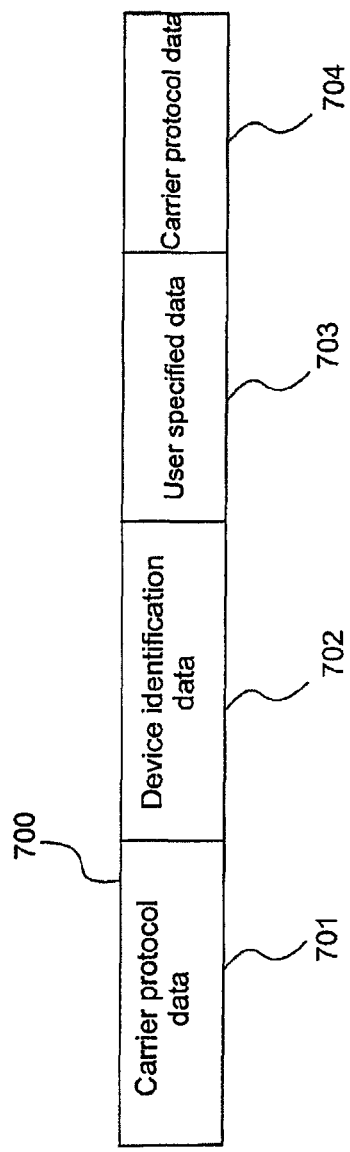
FIG. 7 illustrates schematically content of a proximity message broadcast by a wireless device.

Referring to FIG. 7 herein, there is illustrated schematically data fields of a proximity message broadcast by a wireless device as described herein. The proximity message comprises a earner protocol data 701, which is a known carrier protocol, for example a Bluetooth signal, which is used as the basis for the proximity signal; a device identification data 702 which may be in addition to the carrier protocol data 701, or where the underlying carrier protocol includes a device identification data, may be incorporated into the carrier protocol data 701; a user specified data field 703 which may be used to contain any information about the transmitting device and which may be incorporated by an algorithm resident at the transmitting device; and, depending upon the underlying carrier protocol used, a final protocol data field 704.

The user specified data field may be assigned a variety of data types, including but not limited to data types selected from the set: time and date data; battery power level data; temperature data; location data; identification of a owner/user of the device; data describing a previous message sent by the device; data describing a previous communication of the device, for example a photo, a text message, or the like; data describing a set of key strokes entered into the device and/or the last operations carried out on the device e.g. menu items selected, pictures taken, calls sent or received, or the like.

Figure 8:
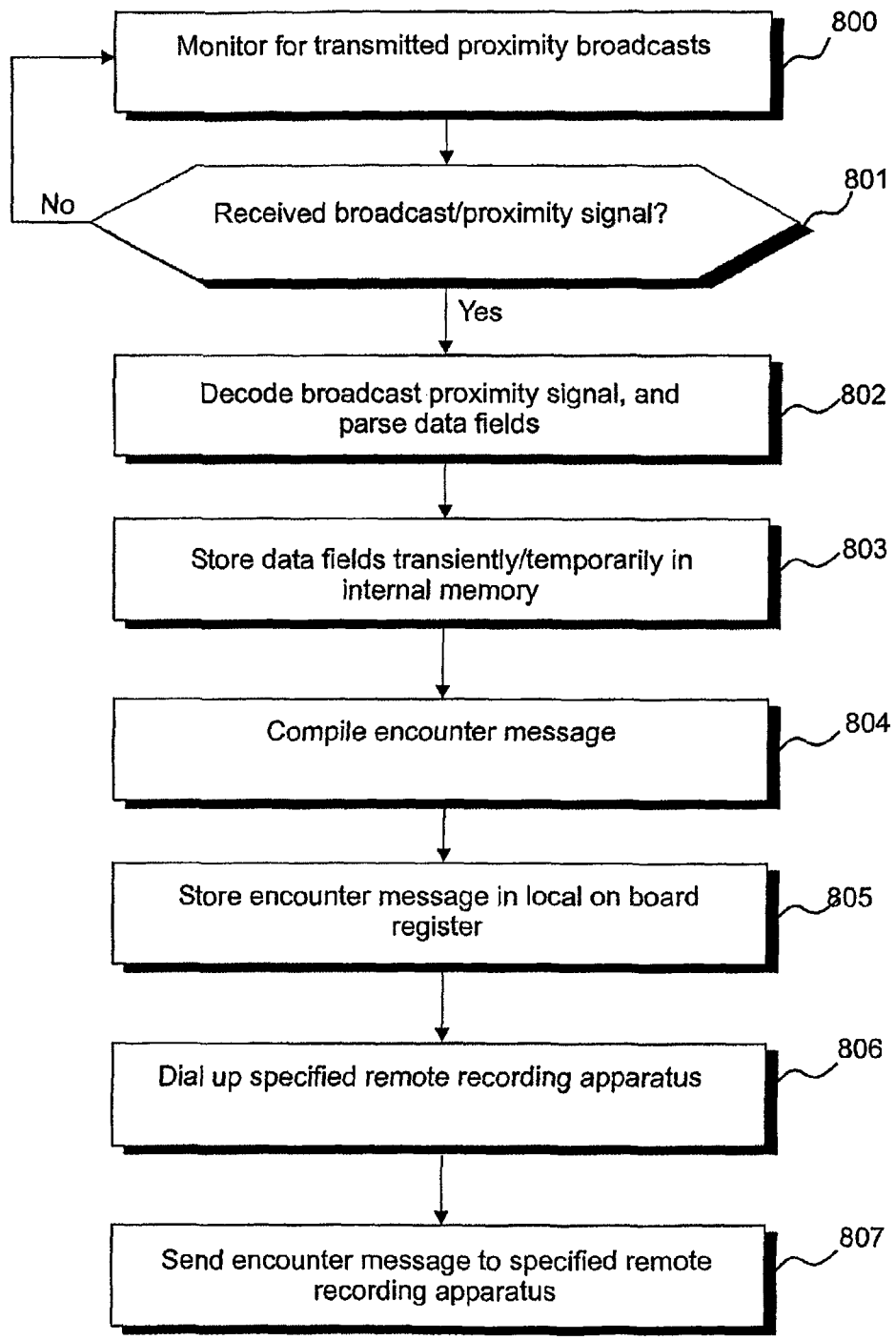
FIG. 8 illustrates schematically, a mode of operation of a wireless device for reporting an unacknowledged encounter with another wireless device.

Referring to FIG. 8 herein, there is illustrated schematically a mode of operation of a wireless device for monitoring and reporting encounters with other devices, in an unacknowledged encounter mode.

The following processes may be carried out sequentially or in parallel as would be understood by those persons skilled in the art.

In process 800, the device monitors for transmitted proximity broadcasts of 10 other wireless devices. In process 801 when a broadcast proximity signal is received from another wireless device, in process 802 the wireless device decodes the broadcast proximity signal and parses any data fields within that signal. In process 803 the device stores the data fields transiently or temporarily in an internal memory to enable the device to create an encounter message in process 804. Optionally, the encounter message, which records the encounter with the other device may be stored in a local onboard register in process 805. In process 806, the device dials up a specified remote recording apparatus. The identification address of the remote recording apparatus may either be parsed from the received proximity message, or it may be stored as pre-stored data in the device which receives the proximity message. In process 807, the device sends the encounter message to the specified remote recording apparatus.

Figure 9:
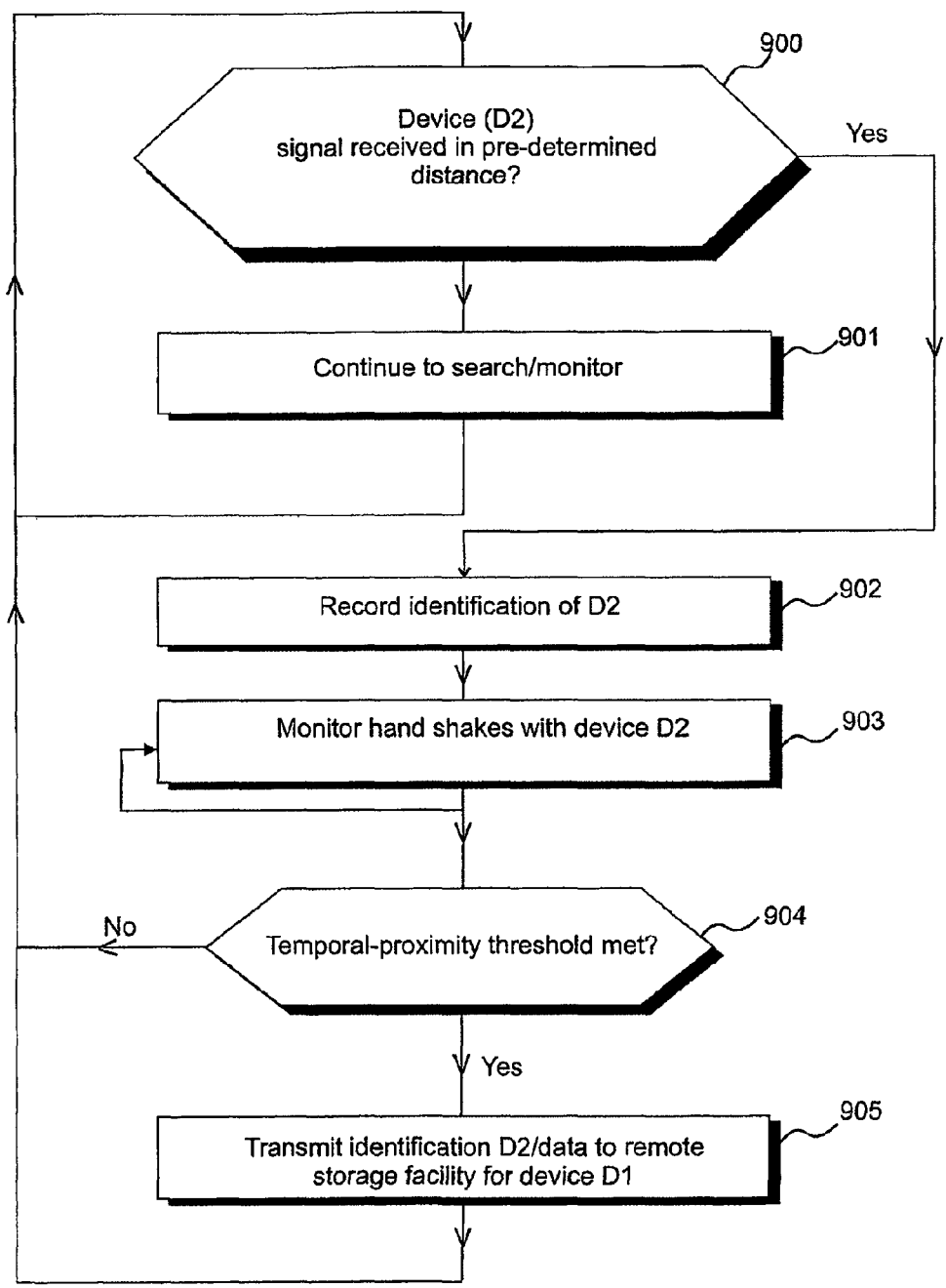
FIG. 9 illustrates schematically processes carried out at a first mobile wireless device during an encounter with another wireless device.

Referring to FIG. 9 herein, there is illustrated schematically processes carried out by a first mobile wireless device when encountering a second wireless device for exchange of an acknowledged encounter and reporting of that acknowledged encounter. The process illustrated in FIG. 9 are shown herein sequentially. However, the skilled person will understand that each process identified may be carried out in parallel. In process 900, the first mobile device detects a short range wireless signal from a second wireless device D2, within range of the first mobile wireless device D If no signal is received, then in process 901, the first mobile device continues to search for and monitor whether any signals are being received from other mobile devices. If in process 900, the first mobile device does detect a second wireless device D2, then in process 902 the first mobile device records an identification signal of the second wireless device D2. In process 803, the first mobile device D1 carries out a hand shake protocol with the second wireless device D2. Optionally, the first mobile device D1 may be set up only to record encounters with other wireless devices where those encounters extend over a pre-determined time period. The first mobile wireless device D1 may continue to exchange hand shake signals with the second wireless device D2, as long it remains within range of that device. If the first mobile device D1 is pre-set such that it only sends an encounter message for encounters with other wireless devices which last over a pre-determined time period, then in process 904 the first mobile wireless device D2 determines whether the pre-determined time period has been satisfied, during which the first mobile wireless device D1 remains in close proximity, i.e. within range and capable of continually hand shaking with the second wireless device D2. If not, then the first mobile device reverts to continue to search for and monitor four mobile wireless devices in process 901. However, if the mobile wireless device does remain within range of the second wireless device D2 for the pre-determined period, then in process 905 the first mobile wireless device D1 initiates transmission of an encounter record message to a remote recording apparatus.

Figure 10:
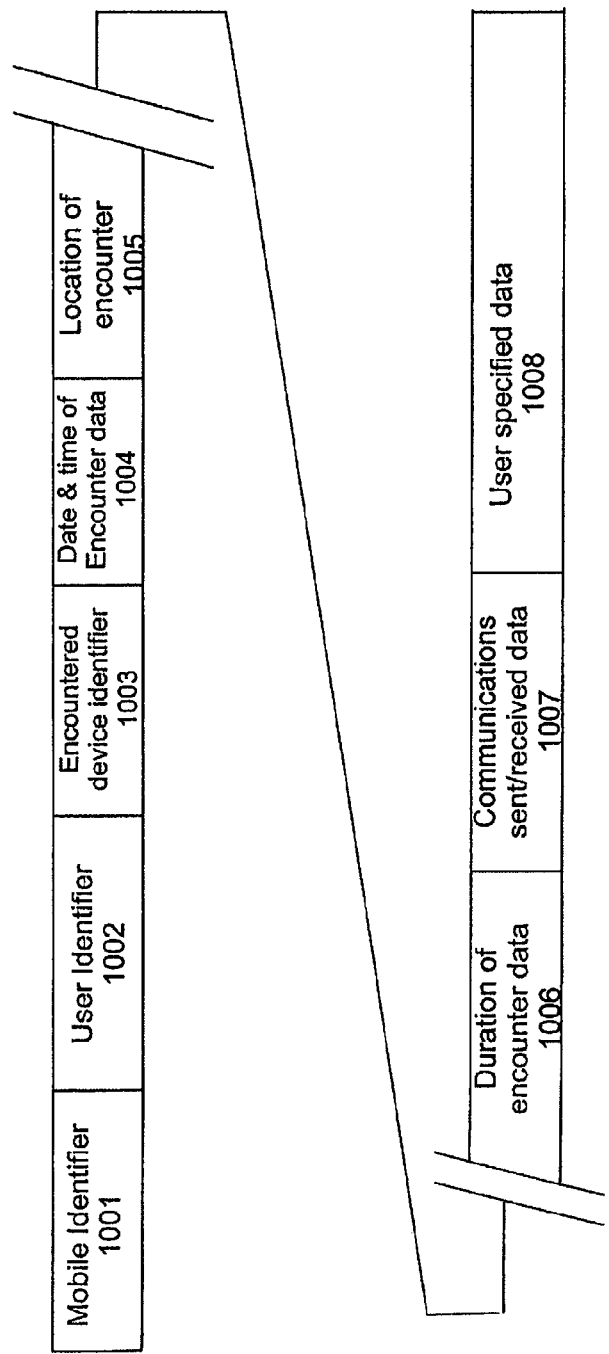
FIG. 10 illustrates schematically data fields of an encounter message sent between a wireless device and a recording device.

Referring to FIG. 10 herein, there is illustrated schematically data fields of an encounter message sent between the mobile wireless device and a remote recording apparatus, or between another wireless device and the remote recording apparatus, either over a wireless link or over a terrestrial or land line communications link. The encounter message 1000 comprises a plurality of data fields as follows:

A mobile identifier field 1001 contains data identifying the mobile wireless device for which an encounter with another device is recorded.

A user identifier field 1002, which contains data identifying a user of the mobile device, and/or a person to whom the mobile wireless device is registered or assigned to.

An encountered device identifier field 1003 contains data which identifies another wireless device, with which the mobile wireless device has been in close physical proximity, that is, has encountered.

A date and time of encounter data field 1004 contains a data describing a date and time of an encounter between the mobile wireless device and the other wireless device, subject of the message.

A location encounter field 1005 which is optional, records a location data describing a location of the encounter. For example, where the other wireless is device is a fixed device is a fixed device provided at a fixed location, data describing that location may be included in the encounter message. Similarly, where the mobile wireless device is fitted with a location sensor, for example a global positioning system (GPS), then data describing the location of the mobile wireless device at the time of the encounter with the other wireless device may be contained in the field. Alternatively, data describing the location at the time of the encounter between the mobile wireless device and the other wireless device may be obtained if the other wireless device is filled with a location sensor apparatus, e.g. a GPS system. It is also possible that this field may contain data on the relative proximity of encountered devices. This could be inferred from the range of the wireless link between the wireless devices or may be in some implementations be estimated, for instance by the use of time signalling, if the wireless link is a Bluetooth link.

A duration of encounter data field 1006 which is optional, may contain data describing a length of time over which the mobile wireless device was within a pre-determined range of the other wireless device. Recording the time of encounter may be done either by the mobile wireless device itself, or by the other wireless device with which the encounter has taken place.

A communication sent/received data field 1007, which is optional, may record data describing any communication sent or received by the mobile wireless device at the time of the encounter. That is, if, at the time of the encounter, the mobile wireless device was sending or receiving a communication, for example a voice call, text message, multi media message (MMS), or any other type of message or communication of which the mobile device is capable of making, then data describing the type of that communication, and optionally other data such as the data describes a further device or destination to which that communication is intended to be received may be recorded in the communication sent data field 1007. Optionally, in a further variation of the embodiment, the communications sent/received data field 1007 may contain data describing a last communication sent or received, at the time of the encounter with the other wireless device. For example, details of the last communication sent or received, or data describing a pre-determined number of last communications, for example the last five communications sent or received by the mobile wireless device immediately prior to its encounter with the other is wireless device may be transmitted as part of the encounter message in the data field 1007.

A user specified data field 1008 may contain any other type of data which can be configured or specified by a user of the apparatus. For example, the user specified data field may be configured to contain data describing a battery power level of the mobile wireless device, thereby giving the information of how long a time has lapsed since the device was re-charged, and/or give an indication of the extent of usage of the mobile device since the last charge. Other types of user specified information may include:

- shock information: if the mobile device is fitted with shock sensors, any abrupt movement or shock to the device, at the time of the encounter, or prior to the encounter may be recorded in the user specified data field 1008;
- temperature data: where the mobile device is fitted with a temperature sensor, the temperature of the device at or immediately before the time of the encounter may be included in the user specified data field 1008;
- light levels: where the mobile device is fitted with light sensors, including variation of such sensors, such as ultra violet light sensors or infra red light sensors, or visible fight sensors, then data describing an environmental light level or ambient light level at the time of the encounter or immediately before the encounter may be included in the user specified data field 1008;
- communications/message data: the user specified data field may be used to include a full copy of the last message sent or received by the mobile wireless device at or immediately prior to the time of the encounter. For example where a user has entered a picture into the mobile wireless device, then a copy of that picture may be included in the encounter message in the user specified data field 1008. This may apply whether the person has sent the picture to a further device, or not. The types of content data, and the conditions under which those content data are included in the user specified message may be specifiable by the user for inclusion in the user specified data field 1008. This field may also contain other data such as pictures taken using a camera on a mobile phone or new number/address details entered on the phone.

key/data/menu operation data; the user specified data field 1008 may contain data describing a pre-determined last number of key stroke operations or menu selections which were input by a user of the device, immediately prior to the encounter subject of the encounter message.

Referring to FIG. 11 herein, there is illustrated schematically one example of a database of records of encounters of a mobile wireless device with a plurality of other devices.

In this example, each record is shown as a line entry occupying a row. Data fields from an incoming received encounter message are parsed, and stored as individual data entries in a record of an encounter. Each data field in an encounter message may be allocated to a corresponding column in the data base in the example shown, although in the general case, allocation of encounter messages received to a database need not follow the architecture shown. For example, in other embodiments, received encounter messages may be saved as text files, consequentially, or in some other data base structure.

In the example shown in FIG. 11, each record comprises data fields as 5 follows:

A date at which the encounter message was received data field 1101. This records the date on which the encounter message was received from the mobile device. The encounter message need not be sent at the time of the encounter, but may be stored by the mobile device and sent later, for example at pre determined dial up periods. If the mobile device is switched off, then this may interrupt transmission until the mobile device is turned on again.

In some implementations, the wireless hand shake facility of the wireless device may still be enabled (power permitting) when the other user functions are switched off. In this manner, a device that appears to be switched off can still hand shake with other wireless devices and leave an encounter trail.

A time at which the encounter message was received at field 1102.

A device identifier data field 1103. This field identifies the other wireless device. In the example shown, the encounter message is configured such that each device encountered is identified by its telephone number if it comprises a telephone communications device, or via any e-mail number. In one case, a device is identified by its manufacturers code.

A date of encounter field 1104. The date of encounter field copies the information contained in the encounter message specifying the date of encounter between the mobile wireless device and the other wireless device.

A location of encounter data field 1106. This records the location of the encounter between the two devices. The data in this field may be taken from either the mobile wireless device, where that device comprises a location detector, or the other wireless device, where that device comprises location detector. Recording the location of the encounter is not obligatory. In some embodiments or configurations of embodiments, the fact that a first device has encountered a second device at all, irrespective of location may be recorded, in which case it is not necessary to record location information. In the example shown, the second encounter occurred with a device in Bradford. The encounter on the seventh encounter record occurred in Leeds. The encounters of the fifth and sixth encounter records occurred at specified grid references, which may be determined from a OPS sensor either on the mobile wireless device or on the other wireless device with which the mobile device has encountered.

A duration of encounter field 1107 records a time period over which the encounter took place. This data is parsed from the encounter messages.

A communication sent/received data field 1108, optionally records details of any communication sent at the time of the encounter, or immediately before the reported encounter, but after the previously reported encounter. In the example shown, the second encounter record shows that one voice communication was sent either at the time of the encounter with the identified other device, or in the time period between 10.04 am and 10.08 am on the 22 Nov. 2004.

A user specified data field 1109 contains data received from a corresponding user specified data field in an encounter message. In the example shown, for the first encounter record, the user specified data field shows that the encounter was with a mobile device. For the fourth record shown in this example, the user specified field includes the actual J Peg PICTURE which was sent at or before the time of the encounter specified for that encounter record. Similarly, for the fifth record, the user specified data field 1109 includes a copy of the text message which was transmitted by the mobile at or immediately before its encounter with the identified device on 22 Nov. 2004, at 14.38. The user specified field may also contain recently entered data that has not been sent such as new address book entries, recent caller/called lists, pictures taken with an incorporated camera or the like.

Taking as an example, the third record shown in the table of FIG. 11, this shows that a encounter message was received by the recording apparatus at 10.22 am on Nov. 22, 2004. The encounter message records an encounter between mobile device A and another device identified by e-mail battye@rbos.com. The date of the encounter was Nov. 22, 2004 at 10.22 am and the location of the encounter was not recorded. The encounter lasted for one minute and 55 seconds. At the time of the encounter, the last message sent by the mobile device A was a voice message. There is no user specified information in the user specified data field of the encounter message.

As has been described hereinbefore, the database is typically stored on a suitable remote recording apparatus. Typically, the recording apparatus would be maintained by a network operator or other agency. It is however possible that the database may be stored on or copied to other relevant authorities such as the police and other emergency services. Additionally, it should be understood that whilst a specific example of a database format storing specific details of encounter records has been disclosed, the skilled man will appreciate that it is not strictly necessary to store such details of all encounters. Indeed any particular combination of the data in these records can be stored as is desired or required. Similarly any portions of the database copied to or stored by other authorities need not use the same database format or store all the information provided in the database format and may instead store any particular combination of the data in these records as is desired or required. In the same manner, records may also be stored on said mobile wireless device and may be in addition to or in place of records stored elsewhere. As above these records may store any combination of data as is desired or required. In all of these cases, additional data to that described in database format 1100 may be stored or linked to records for a particular mobile wireless device, such as medical records and the like.

Figure 12:
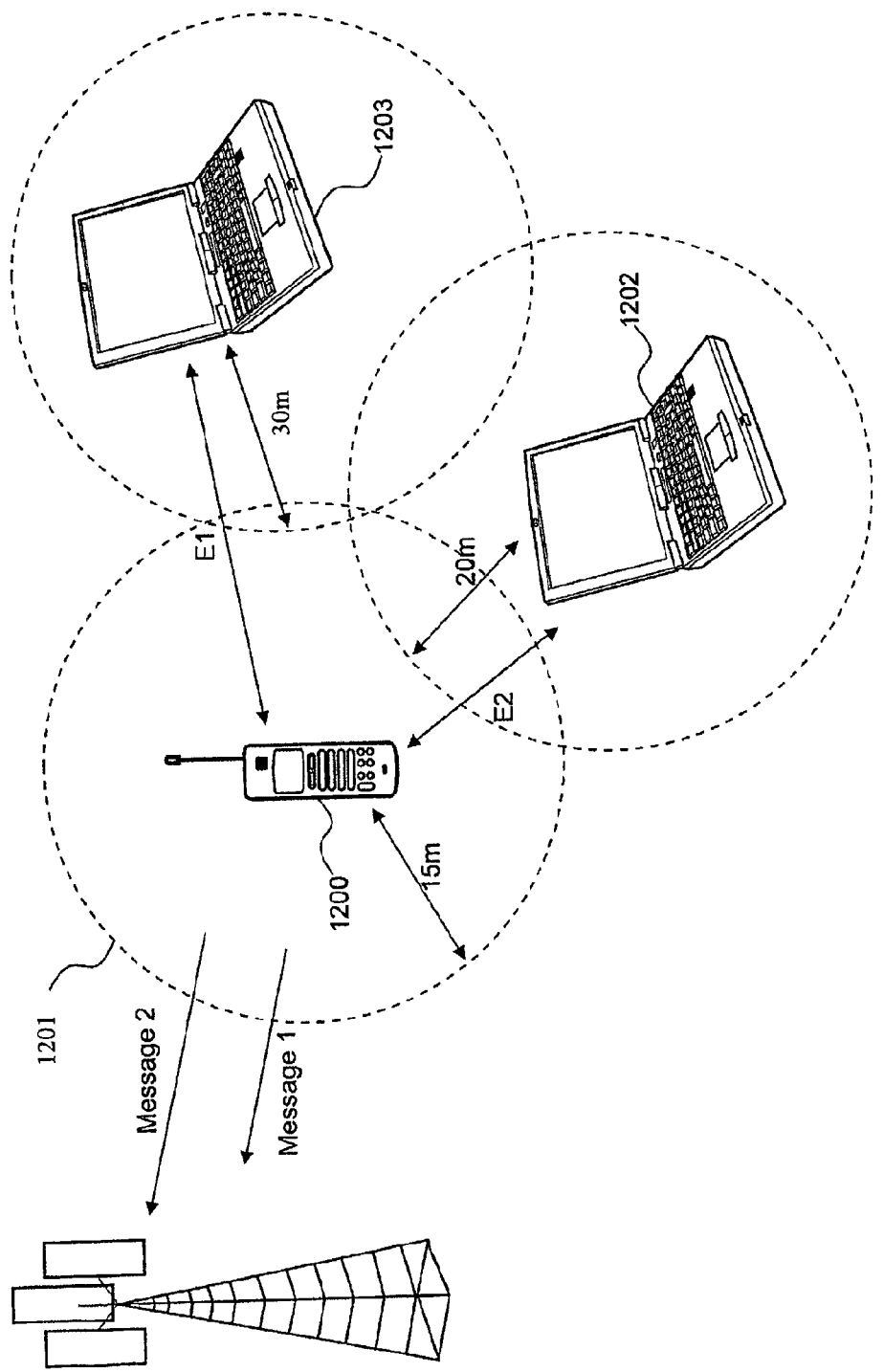
FIG. 12 illustrates schematically an encounter between a first mobile wireless device, a second wireless device and a third wireless device.

Referring to FIG. 12 herein, there is illustrated schematically a situation where a mobile wireless device 1200, having an omni directional wireless reception field 1201 of a range 10 meters is moved within physical proximity of a second wireless device 1202 having a wireless transmission/reception range of 20 meters, and at the same time, encounters a third wireless device 1203 having a wireless reception/transmission range of 30 meters. The first mobile device 1100 encounters both the second wireless device and the third wireless device at the same time.

In this example, the first wireless device 1200 generates encounter messages for its encounters with both the second wireless device 1202 and the third wireless device 1203. Since the encounters overlap in space and time, two separate encounter messages are generated, the first encounter message describing the encounter between first mobile wireless device 1200 and second wireless device 1202, and the second encounter message containing data describing the encounter between the first mobile wireless device 1200 and the third wireless device 1203.

The first mobile device 1200 may transmit the first and second encounter messages either at the time of the encounters, or with a delay thereafter, for example sending these at pre-determined times e.g. every hour, half hour or once per day. Transmission of the two encounter messages to a wireless base station is shown schematically in FIG. 12.

The register may provide a record of the personal movements of a person overtime, as recorded by a mobile device carried by that person.

The register may find wide spread application for various monitoring purpose. For example, the movements and whereabouts of criminal suspects or witnesses in court oases may be identified through records stored in the register. Similarly for victims of crimes, records of their movements and locations may be useful to identify other persons who were in a close proximity at a time of a criminal activity, such as an attack on the victim. The register includes data identifying the particular mobile device, and to whom the mobile device is associated with, i.e. held by or issued to. The register may be accessed by authorities such as the police, or the national crime intelligence service (NCIS) so that those organizations could identify persons in a particular geographical location or physical area at a particular time.

Other applications of the register include the following:

Witness protection—during court cases, it is important that witnesses are not victimised or intimidated prior to or during a trial. A witness carrying a mobile device which is configured to record encounters with other mobile devices may provide a record of persons and/or places with whom the witness has had proximity over a particular time period. By comparing the register entries of the witness with mobile devices known to be carried by associates of suspects in a case, or other persons associated with a trial, that information can be taken into account in determining the reliability of the evidence given by the witness.

Tagging of criminal suspects and/or known criminals—the activities, whereabouts and meetings of known criminals and criminal suspects is always of interest to police authorities. Register entries recording interactions of a mobile device carried by a suspected or convicted criminal, with other mobile devices of other persons may provide a record of meetings and movements of the suspected or convicted criminal of interest and enable authorities to build up a picture of that persons whereabouts, and persons who interact with that suspected/convicted criminal over a time period. The register entries may help the police build up a characteristic profile of a person so that that person can either be excluded from police inquiries, or so that that person can be targeted for more advanced monitoring or surveillance by the police. The mobile device may be attached to a criminal or suspect in a manner where the person cannot remove the device, for example strapped around the persons arm or leg using a plastic strap.

Covert tracking of criminal suspects and/or known criminals—if a mobile wireless device associated with a known criminal encounters a static wireless device in an area designated high risk in relation to that criminal e.g. a school in respect of a registered sex offender, then an alert can be raised. The alert may include information on the nature of the threat posed and the likely manner in which the threat should be combated. Information about the threat may be sent to mobile and static devices associated with those at risk whilst information relating to combating the threat may be sent to the police or other emergency services.

As a witness compiler, the register may provide a list of persons who may be able to assist in intelligence gathering. Often persons do not volunteer themselves in evidence, however, the register records may reveal persons to the police authorities who may otherwise have gone unnoticed.

Pupil attendance registration—in many schools and colleges, a register of persons attending the school is collected every morning, currently this is done in many cases as a manual system by calling out names and filling names into a book. The embodiments disclosed herein may be used to automatically register pupils with a centralised register kept on a server device by the school, or remotely at a local or regional education authority. Each person may have a mobile device, for example a mobile phone or the like which is registered with the system. When a person attends the school or college, static communication devices located at the school or college may automatically communicate with the students or pupils mobile device automatically when they are in proximity, i.e. within a pre determined distance from each other.

Employee clock on/clock off—it is well known in factories and offices for workers to clock in and clock out. Particularly, with increased working from home and flexi time working, the importance of recording the hours when an employee has attended a work place increases, so that the organizations can make sure that the employees are credited for all their working hours performed. Each employee may carry a mobile communications device of a type described herein, which may automatically communicate with one or more static devices placed around a work place, such as an office or factory, and every time the mobile device crosses one of the static proximity monitors, a record may be stored on a register which may be provided within the organizations premises or remotely on a network or anywhere on the Internet, recording the whereabouts of the employee holding the mobile device, and any other data such as the location of the static device with which registration occurred, and the time at which registration occurred. In a variation of this embodiment, an organization may accept a working activity as being an activity involving two or more employees or workers. In this case, two or mobile devices may register with each other when two or more workers form a meeting or coalesce to perform a work activity. Entries of each worker and there registration with the static devices or mobile devices of other workers may be stored in a central database and used for purposes of training, employee monitoring, work time and motion efficiency studies, for calculating the employees payable hours or other like purposes.

Hospital and health monitoring—in public buildings such as hospitals, It is important to know who is in the building and who is out of the building, and how many people are in the building for purposes such as fire regulations and security. A set of static monitors may be placed at entrances to a hospital, and patients, visitors and/or members of medical staff or medical support staff may register with the static monitors as they pass in and out of the building, or as they move around locations within the building.

Scene of incident—police or other emergency services may use handheld mobile wireless devices to handshake with wireless devices in the vicinity of an incident (typically a crime or an accident). The police devices may be operable to retrieve encounter or other stored data (say, medical records or allergy warnings) from said wireless devices in the vicinity of the incident. For instance a static wireless device on a house may have a record of an encounter with a mobile wireless device associated with a known housebreaker.

Tracking stolen goods—a wireless device provided in a stolen vehicle may hand shake with other static or mobile devices. These encounters may be used to track the vehicle. Additionally, a hand shake between the wireless device on a stolen vehicle and a fuel station may result in a fuel pump being shut off or a hand shake between a stolen vehicle and a secure building such as a bank or airport may trigger a raised alert level.

In the embodiments above wherein communication via WAP is referred to, this should be understood to include communication via the PAP protocol defined in WAP-164 of the Wireless Application Protocol Suite available from Open Mobile Alliance. PAP is used particularly for communicating with a Push Proxy Gateway, which is typically part of a WAP Gateway.

It is of course to be understood that the invention is not to be restricted to the details of the above embodiments which are described by way of example only. For instance, it should also be understood that the invention as set out above may also operate with other wireless devices than those specifically referred to above e.g. RF security tags and RF security tag readers may have and/or record and/or communicate encounters with personal wireless devices in accordance with the present invention.

It is also to be understood that wherein the invention refers to specific wireless networks or wireless network standards that the invention is not to be restricted to use with those particular networks or network standards, these having been specified purely as examples. For instance the invention may operate using wireless networks including but not limited to the following: HSPDA (High Speed Download Packet Access); i-mode; PDC/PDC-P (Personal Digital Cellular 800 MHz/1.5 GHz Packet Transmission Services); USSD (Unstructured Supplementary Services Data, a capability of al GSM phones and typically used to trigger independent calling services such as a callback service or interactive menu service); WiDEN (Wideband Integrated Dispatch Enhanced Network, this allows compatible subscriber units to communicate across four 25 kHz channels combined for up to 100 kbits of bandwidth; or any other wireless network presently defined or to be defined that may operate as a replacement or alternative to any wireless network referred to herein.

Reference to a particular type of wireless network should also be taken to include reference to all subtypes or related types of network. For instance, CDMA has been referred to above this will of course include, but not be limited to, OFCDM (Orthogonal Frequency Code Division Multiplexing), VSF-OFCDM (Variable Spreading Factor-OFCDM), W-CDMA (Wideband-CDMA) and MC-CDMA (Multiple Carrier-CDMA).

The invention claimed is:

1. A method for detecting whether a particular mobile wireless device in a vehicle is encountering a fuel pump at a fuel station and controlling whether the fuel pump is activated, comprising:

collecting data describing at least one encounter of a mobile wireless device provided in a vehicle with at least one other wireless located at a fuel station, said other wireless device being configured to control whether an electrically-powered fuel pump located at the fuel station can be activated in response to whether said static wireless device detects a digital handshake with a particular mobile wireless device;

conducting a digital handshake between said mobile wireless device and said at least one other wireless device over a wireless link;

preventing activation of said fuel pump in response to detection of a particular mobile wireless device; and communicating a record of each said encounter between said mobile wireless device and said other wireless device that meets a criteria for determining that an encounter occurred to a recording device under substantially all circumstances without creating an intrusion to a user of said mobile wireless device.

2. The method as claimed in claim 1, wherein said handshake occurs whenever said mobile wireless device is within a pre-determined range of said other wireless device.

3. The method as claimed in claim 1, wherein said handshake protocol occurs whenever said mobile wireless device encounters said other wireless device for a pre-determined time period.

4. The method as claimed in claim 3, wherein said pre-determined time period is definable by an authorised operator of said mobile wireless device.

5. The method as claimed in claim 3, wherein said pre-determined time period is definable by an authorised operator of said other wireless device.

6. The method as claimed in claim 1, wherein said digital handshake is conducted over a wireless link selected as one of the following types of wireless link:
a bluetooth wireless link;
a WIFI wireless link operating at a band in the range 933 Mhz-1400 Mhz;
an IEEE 802.16 WiMax link;
an IEEE 802.20 MobileFi link;
an IEEE 802.11 link;
an IEEE 802.15 ZigBee link.

7. The method as claimed in claim 1, wherein said mobile device comprises a personal mobile telephone handset.

8. The method as claimed in claim 1, wherein said mobile device comprises a device selected from the set:
a personal digital assistant (PDA);
a portable laptop computer;
a portable note book computer;
a wearable computer.

9. The method as claimed in claim 1, wherein said at least one other wireless device comprises a user portable mobile wireless device.

10. The method as claimed in claim 1, wherein said digital handshake comprises an exchange of wireless signals between said mobile device and said at least one other wireless device, in which a signal identifying one of said devices is received by the other said device.

11. The method as claimed in claim 1 wherein a said digital handshake comprises:
an exchange of signals between said mobile wireless device and said at least one other wireless device, in which each said device receives a signal from the other said device, said signal identifying said other device.

12. The method as claimed in claim 1, wherein said record of said encounter comprises:
data identifying said mobile wireless device; and data identifying said at least one other wireless device.

13. The method as claimed in claim 1, wherein said record of said encounter comprises data including:
data describing a time and/or date on which said digital handshake occurred.

14. The method as claimed in claim 1, wherein said record of said encounter comprises includes data comprising:
data describing a location of said mobile wireless device at a time when said digital handshake occurred.

15. The method as claimed in claim 1, wherein said record of said encounter comprises:
data describing a location of said at least one other wireless device at a time when said digital handshake occurred.

16. The method as claimed in claim 1, wherein said record of said encounter includes a user specified data field which is assignable to contain a user specified data type.

17. The method according to claim 16, wherein user specified data type is selected from the set:
text message data;
ring tone data;
audio data;
image data;
digital data describing menu selections of a device;
digital data describing key stroke and/or key pad inputs to a device.

18. The method as claimed in claim 1, wherein said record of said encounter comprises a data field for containing data describing a recent history of communication sent or received by a said device.

19. A method for detecting whether a particular mobile wireless device in a vehicle is encountering a fuel pump at a fuel station and controlling whether the fuel pump is activated, comprising:
describing an encounter between a mobile wireless device provided in a vehicle and at least one other wireless device located at a fuel station, said other wireless device being configured to control whether an electrically-powered fuel pump located at the fuel station can be activated in response to whether said static wireless device detects a digital handshake with a particular mobile wireless device;
conducting a digital handshake between said mobile device and said at least one other device over a wireless link when said mobile device and said at least one other wireless device are within a pre-determined range of each other;
preventing activation of said fuel pump in response to detection of a particular mobile wireless device; and
storing said record of said encounter in a data storage device remote from said mobile wireless device.

20. The method as claimed in claim 19, wherein said digital handshake occurs whenever said mobile wireless device encounters said other wireless device for a pre-determined time period.

21. A method for detecting whether a particular mobile wireless device in a vehicle is encountering a fuel pump at a fuel station and controlling whether the fuel pump is activated, comprising:
collecting data describing at least one encounter of a mobile wireless device provided in a vehicle with at least one other wireless device that is static at a fixed location, said other wireless device being located at a fuel station and configured to control whether an electrically-powered fuel pump located at the fuel station can be activated in response to whether said static wireless device detects a digital handshake with a particular mobile wireless device;
conducting a digital handshake between said mobile wireless device and said at least one other wireless device that is static at a fixed location over a wireless link;
preventing activation of said fuel pump in response to detection of a particular mobile wireless device; and communicating a record of said encounter between said mobile wireless device and said other wireless device that is static at a fixed location to a remote recording device.

22. The method defined in claim 21, wherein said other wireless device that is static at a fixed location is at a building and is configured to send an alert to a party having responsibility for said building, its contents, personnel, or occupants in response to said digital handshake being conducted with a particular mobile wireless device.

23. The method defined in claim 1, wherein said record is maintained in a data store at a remote location, said method including comparing said record to other records of particular mobile devices associated with one or more particular individuals designated as high risk for being in the vicinity of particular other mobile devices or fixed locations and, in the event of a match, initiating a notification to a party having responsibility for the security of said particular other mobile devices or fixed locations.

24. The method defined in claim 1, wherein the step of conducting said digital handshake is enabled even when the other user functions are switched off.

\* \* \* \* \*